Jan. 18, 1927.  
A. SZANDROWSKY  
1,615,053  
VALVE LIFTER  
Filed March 2, 1926
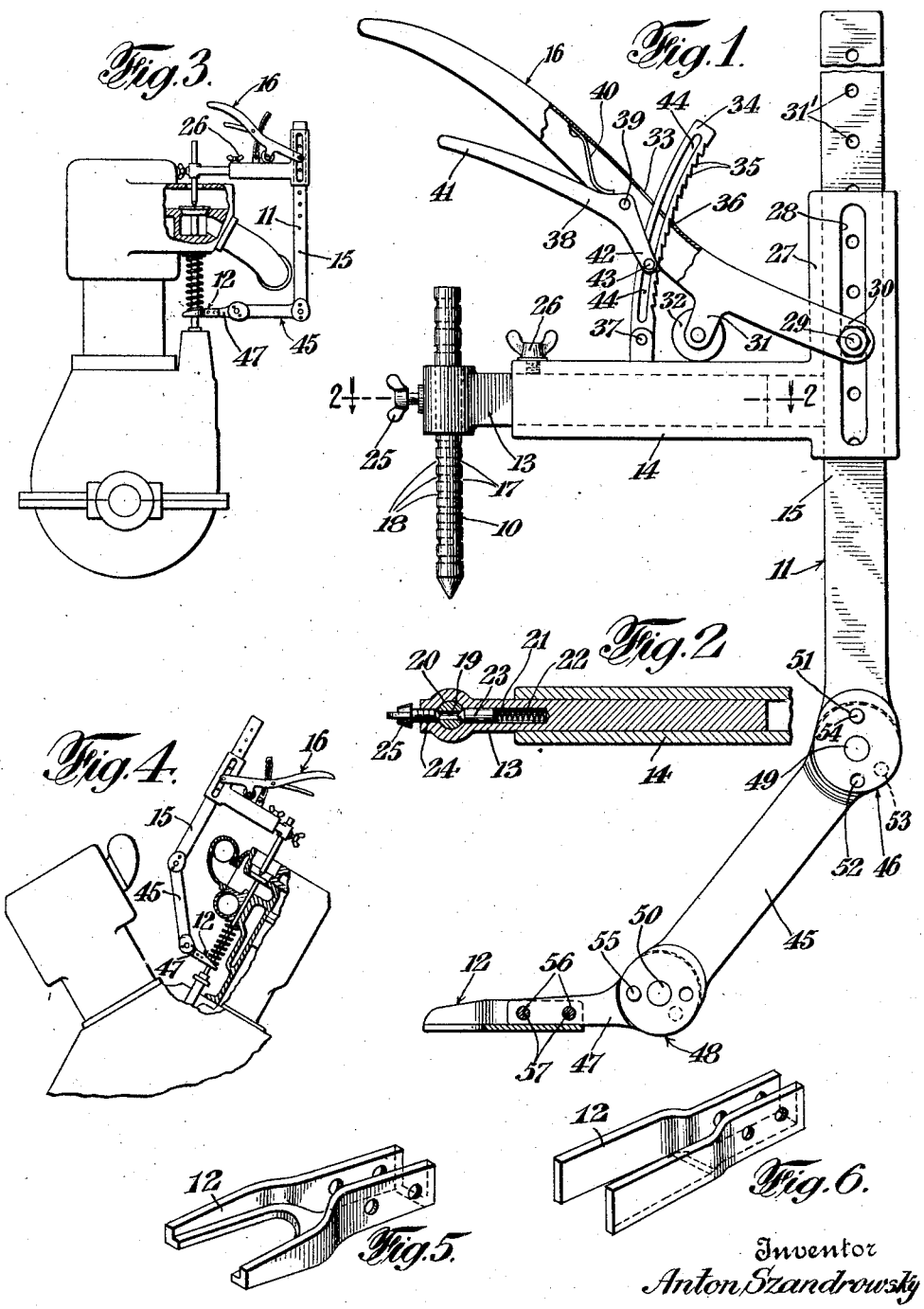
Inventor  
Anton Szandrowsky  
By his Attorneys  
Ward, Crosby, + Smith Patented Jan. 18, 1927.

1,615,053

UNITED STATES PATENT OFFICE.

ANTON SZANDROWSKY, OF NEW YORK, N. Y., ASSIGNOR TO CHARLES H. DURFEE, OF FOREST HILLS, NEW YORK.

VALVE LIFTER.

Application filed March 2, 1926. Serial No. 91,685.

This invention is a device for compressing springs, and is particularly adapted for use as a valve lifter, such as for internal combustion engines.

The objects of this invention include the provision of a very simple, durable, and inexpensive construction for the purposes desired, such construction embodying substantially the minimum number of parts and being dependable and certain in its operation.

Further objects, features, and advantages will appear from the following specification and claims taken in connection with the accompanying drawings in which:— Fig. 1 is an elevational view partly in section illustrating a valve-lifting tool embodying my invention;

Fig. 2 is a detailed sectional view taken substantially along the line 2—2 of Fig. 1.

Fig. 3 illustrates the manner in which the device of Fig. 1 may be used in connection with a vertical cylinder internal combustion engine;

Fig. 4 illustrates the manner in which the device of Fig. 1 may be used in connection with a V type internal combustion engine; and Figs. 5 and 6 illustrate in perspective two alternative types of valve-spring engaging means which may be applied to the device of Fig. 1.

Referring to Fig. 1, the valve-lifting tool there shown comprises a valve-head engaging pin 10 secured in respect to a frame 11, which frame also carries a valve-spring engaging member 12. The pin 10 is embraced by a supporting arm member 13, which in turn is telescopically and adjustably received by an arm or frame member 14. The arm member 14 slidably engages a link member 15 which also forms a part of the frame 11. The position of the arm 14 in respect to the link 15 is controlled by a manually releasable self-locking grip lever 16, the operation and details of which will hereinafter be further described.

The pin 10 may be formed with two series of depressions 17 and 18 located respectively along opposite sides of the pin. These depressions may be conveniently provided merely by drilling diametrically through the pin, leaving drill holes as shown at 19 in Fig. 2. These drill holes are preferably suitably spaced along the pin 10 for permitting predetermined adjustments of the pin position to be made, in order to accommodate engine constructions of various known dimensions. As shown in Fig. 2 the arm member 13 is suitably apertured as at 20 to receive the pin 10. The arm 13 also is formed with a longitudinally extending drill hole 21 for receiving a coiled compression spring 22 and a detent member 23. The detent member 23 is urged into contact with the pin 10 by the spring 22, the detent being preferably formed with a somewhat tapered or pointed end for effecting secure engagement with the depressions or apertures 17 formed in the pin 10. This spring-pressed detent provides means for yieldingly retaining the pin at the various predetermined positions of adjustment within the arm 13. In order to positively clamp the pin at the various positions of adjustment the aperture 21 may be threaded as at 24 for receiving a thumb-screw 25, which may be turned into engagement with the depressions or apertures 18 formed in the pin 10. In order to change the position of adjustment of the pin 10. it is merely necessary to release the thumb-screw 25 and thereupon the pin may be moved to the desired new position of adjustment and there clamped by again tightening the thumb-screw 25.

The telescopic arms 13 and 14 as indicated are preferably of a square or other suitable cross-section for preventing relative turning movement. In the construction here shown the arm 14 is made tubular in form to receive the arm 13. These arms may be clamped in the desired adjusted relation by means of a thumb-screw 26.

For embracing the link member 15 the arm 14 is provided with a sleeve portion 27 formed with a longitudinal slot 28 for accommodating a fulcrum pin 29 for the grip lever 16. The grip lever 16 may comprise a sheet-metal stamping of channel-shaped cross-section having lugs as at 30 pivotally mounted upon the fulcrum pin 29 at either side of the tool. In order to supplement the adjustments which may be made to the pin 10, the position of the fulcrum pin 29 is also made adjustable, and to this end the link 15 is provided with a plurality of spaced apertures as at 31' which permit a wide range of adjustment.

The lever 16 may be also formed with suitable lugs as at 31 for pivotally mounting a roller 32. The roller 32 engages the edge of the arm 14 and upon the application of pressure to the lever 16 the link member 15 and associated parts are drawn upwardly in respect to the arm 14, thereby effecting the desired compression of the valve spring.

The lever 16 may be apertured at 33 to accommodate a toothed quadrant member 34 provided with teeth 35 for engaging the lever 16 as at 36 at the periphery of the aperture 33. The quadrant member 34 may be pivotally connected at 37 to the arm 14. A small bell-crank lever 38 is pivotally mounted at 39 within the handle 16 and is normally pressed outwardly of the handle by a spring strip 40. One end of this bell-crank member comprises a grip portion 41, whereas the other end or arm 42 is provided with a pin 43 which engages an arcuate slot 44 formed in the quadrant member.

A link 45 is interconnected with the link 15 at the lower end thereof by a knuckle joint 46. The link 45 in turn is interconnected with a foot member 47 by a similar knuckle joint 48. To form the knuckle joints 46 and 48, the link members may be provided with suitably apertured lugs for receiving pivoting pins 49 and 50 respectively. The lug portions of the links may be provided with other apertures positioned eccentrically with respect to the pins 49 and 50 and, as indicated, at 51, 52 and 53. Removable locking pins at 54 and 55 may be inserted within these apertures for locking the knuckle joints at the desired angular positions of adjustment. For certain types of engines it is necessary that the link 45 be positioned substantially in alinement with the foot member 47 in order to avoid interference with the assembled parts of the engine upon which the tool is to be used. In other types of engines it is necessary that the link 45 be positioned at an obtuse angle in respect to the link 15 and as shown in Fig. 1. In order to adjust the link 45 into alinement with the foot member 47 and at right angles to the link 15, the locking pins 54 and 55 are first removed, thus rendering the knuckle joints freely operable. When the parts are moved to the desired relative positions, the locking pins may be again inserted into other alined openings at the knuckle joints. For example, the aperture 53, which is formed in the link 45, may be brought into alinement with apertures 52 formed in the link 15. The locking pin may be then inserted through these alined apertures.

The foot member 47 may be formed with a pair of apertures as at 56 for receiving removable pins 57. The spring-engaging member 12 may comprise a forked portion for embracing the lower end of the spring and an attaching portion affixed to the foot member 47 by the pins 57. Suitable forked spring-engaging members for various types of valve springs are indicated in Figs. 5 and 6. These members may be interchangeably secured to the foot member 47 by taking out the pins 57, sliding the forked members into position and then replacing the pins.

In order to use this device for removing or replacing the valves of an internal-combustion engine, the pin 10 is applied to the head portion of the valve and the forked spring-engaging member 12 is at the same time placed in engagement with the lower end of the valve spring. With certain types of internal-combustion engines, such for example as the well known V type, it is necessary to adjust the relative positions of the frame link members in the manner shown in Figs. 1 and 4. With the link members in this relation a frame of a substantially polygonal shape is provided which avoids interference with the assembled parts of engines of this type. By reference to Fig. 4 it will be observed that the link 45 with the spring-engaging member 12 may be readily inserted between the adjacent cylinders and again removed without the necessity of dismantling the engine.

With other types of engines, for example certain constructions with vertical cylinders, it may be necessary to adjust the links 45 and 15 at right angles to each other in order that the frame of the tool may correspond to the general contour of such engines. By reference to Fig. 3 it will be observed that the foot member 47 and the link 45 are substantially in alinement, and in such position an arm for the spring-engaging member is provided of sufficient length so that the entire frame 11 of the tool avoids interference with the exhaust manifolds and other assembled parts of the engine.

In order that the position of the pin 10 may be adjusted in respect to the link 15 and particularly to permit the pin 10 to be adjusted into alinement with the spring-engaging member 12 after the knuckle joints have been adjusted, the telescopic arms 13 and 14 may be adjusted. This may be accomplished merely by releasing the thumbscrew 26. In order to apply the pin 10 to the valve head portions, it may also be necessary to loosen the thumbscrew 25, which permits the pin 10 to be withdrawn or suitably adjusted.

After the various adjustments have been made to accommodate the particular engine construction with which the device is being used, and while the valve head and valve-spring engaging members are in the proper positions, the valve spring may be compressed merely by depressing the lever 16 which causes the link 15 to be drawn upwardly in respect to the arm 14. During this movement the roller 32 provides a substantially frictionless engagement between the lever and the arm 14. When the valve spring is compressed to the desired extent, the lever 16 will lock the tool in clamping condition, since the spring 40 and bell-crank member 38 will force the quadrant member 34 into engagement with the lever 16 at the aperture 33. In order to release the tool, it is merely necessary for the operator to grasp the lever 16 simultaneously with the grip portion 41 thereby unlocking the lever.

From the above description and explanation, it will be apparent that the tool may be adjusted to accommodate a wide variety of engine constructions. Accordingly only a single valve-lifting tool is necessary for substantially all standardized types of engine constructions including both vertical cylinder types and V type engines of various dimensions.

While the invention has been described in detail in respect to a particular preferred example thereof which gives satisfactory results, it will be understood by those skilled in the art after understanding the invention that various changes and modificaions may be made without departing from the spirit and scope of the invention, and it is therefore intended in the appended claims to cover all such changes and modifications.

What is claimed as new and desired to be secured by Letters Patent is:

1. A valve-lifting tool such as for internal-combustion engines, comprising means for engaging respectively the valve head portion and valve spring, connecting links for operatively securing said means in respect to each other, said links being interconnected by pivoted knuckle joints, and pin means for positively locking said joints in either of two predetermined positions whereby the links may accommodate the general contour of both vertical cylinder and V-type engine constructions.

2. In a valve-lifting tool, a frame, means on said frame for engaging the valve spring, a pin member for engaging the valve head portion, an arm forming a part of the frame and embracing said pin member, said pin member being slidably adjustable within said arm, spring-pressed detent means for yieldingly retaining said pin at various predetermined positions of adjustment, and releasable means for positively clamping the pin at said positions.

3. In a valve-lifting tool, a frame, means on said frame for engaging the valve spring, a pin member for engaging the valve head portion, an arm forming a part of the frame and embracing said pin member, said pin member being slidably adjustable within said arm, a series of transverse perforations being formed through said pin, spring-pressed detent means for yieldingly retaining said pin at various predetermined positions of adjustment by engagement with the pin at said perforations, and releasable screw means for engagement with the pin at the opposite ends of said perforations and for positively clamping the pin at said positions.

4. In a valve-lifting tool, a frame, means on said frame for engaging the valve spring, a pin member for engaging the valve head portion, an arm forming a part of the frame and embracing said pin member, said pin member being slidably adjustable within said arm, said arm being telescopically adjustable in length to accommodate various engine constructions, and means operative at the end of said arm opposite from said pin for controlling the effective length of the frame to compress or release the valve spring.

5. A valve-lifting tool such as for internal-combustion engines, comprising means for engaging respectively the valve head portion and valve spring, connecting links for operatively securing said means in respect to each other, said valve-head engaging means comprising an arm slidably mounted in respect to one of said links, and a manually releasable self-locking grip lever for controlling said arm to compress or release the valve spring.

6. A valve-lifting tool such as for internal-combustion engines, comprising means for engaging respectively the valve-head portion and valve-spring, connecting links for operatively securing said means in respect to each other, said valve-head engaging means comprising an arm slidably mounted in respect to one of said links, and a manually operable clamping lever pivotally attached to said last-named link and fulcrumed against said arm upon a roller bearing.

7. A valve-lifting tool such as for internal-combustion engines, comprising means for engaging respectively the valve head portion and valve spring, connecting links for operatively securing said means in respect to each other, said valve-head engaging means comprising an arm slidably mounted in respect to one of said links, said last-named link having a series of perforations, and a manually operable clamping lever provided with pivotal attaching means for alternatively engaging said link at various of said perforations, said lever being fulcrumed against said arm.

8. A valve-lifting tool such as for internal-combustion engines, comprising means for engaging respectively the valve head portion and valve spring, connecting links for operatively securing said means in respect to each other, said valve-head engaging means comprising an arm slidably mounted in respect to one of said links, a manually operable clamping lever pivotally attached to said last-named link and fulcrumed against said arm upon a roller bearing, and a manually releasable catch member spring-pressed into engagement with said lever to retain the same in various clamping positions.

In testimony whereof I have signed my name to this specification.

ANTON SZANDROWSKY.